US008332218B2

(12) United States Patent
Cross, Jr. et al.

(10) Patent No.: US 8,332,218 B2
(45) Date of Patent: Dec. 11, 2012

(54) CONTEXT-BASED GRAMMARS FOR AUTOMATED SPEECH RECOGNITION

(75) Inventors: Charles W. Cross, Jr., Wellington, FL (US); Frank L. Jania, Chapel Hill, NC (US)

(73) Assignee: Nuance Communications, Inc., Burlington, MA (US)

( * ) Notice: Subject to any disclaimer, the term of this patent is extended or adjusted under 35 U.S.C. 154(b) by 1536 days.

(21) Appl. No.: 11/423,710

(22) Filed: Jun. 13, 2006

(65) Prior Publication Data

US 2007/0294084 A1 Dec. 20, 2007

(51) Int. Cl.
*G10L 15/00* (2006.01)
*G10L 21/00* (2006.01)

(52) U.S. Cl. .................. 704/231; 704/270.1; 704/275

(58) Field of Classification Search ........... 704/E15.044, 704/10, 251, 257, 270.1, 275
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Gulau et al. | |
| 5,819,220 A * | 10/1998 | Sarukkai et al. | 704/270.1 |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,606,599 B2 | 8/2003 | Grant et al. | |
| 6,728,752 B1 * | 4/2004 | Chen et al. | 709/203 |
| 6,856,960 B1 | 2/2005 | Dragosh et al. | |
| 6,920,425 B1 | 7/2005 | Will et al. | |
| 6,944,594 B2 * | 9/2005 | Busayapongchai et al. | 704/275 |
| 6,964,023 B2 * | 11/2005 | Maes et al. | 715/811 |
| 6,999,930 B1 | 2/2006 | Roberts et al. | |
| 7,010,490 B2 * | 3/2006 | Brocious et al. | 704/275 |
| 7,035,805 B1 | 4/2006 | Miller | |
| 7,043,431 B2 * | 5/2006 | Riis et al. | 704/259 |
| 7,047,197 B1 * | 5/2006 | Bennett | 704/275 |
| 7,085,723 B2 * | 8/2006 | Ross et al. | 704/275 |
| 7,171,243 B2 | 1/2007 | Watanabe et al. | |
| 7,188,067 B2 | 3/2007 | Grant et al. | |
| 7,313,525 B1 * | 12/2007 | Packingham et al. | 704/270 |

(Continued)

FOREIGN PATENT DOCUMENTS

CN 1385783 12/2002

(Continued)

OTHER PUBLICATIONS

Axelsson, et al.; "XHATML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Jesse Pullias
(74) *Attorney, Agent, or Firm* — Wolf, Greenfield & Sacks, P.C.

(57) ABSTRACT

Methods, apparatus, and computer program products for providing a context-based grammar for automatic speech recognition, including creating by a multimodal application a context, the context comprising words associated with user activity in the multimodal application, and supplementing by the multimodal application a grammar for automatic speech recognition in dependence upon the context.

33 Claims, 11 Drawing Sheets

U.S. PATENT DOCUMENTS

| | | |
|---|---|---|
| 7,330,890 B1 | 2/2008 | Partovi et al. |
| 7,376,586 B1 | 5/2008 | Partovi et al. |
| 7,487,085 B2 | 2/2009 | Cross |
| 7,509,569 B2 | 3/2009 | Barrus et al. |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Seinel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Farrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0243407 A1 * | 12/2004 | Yu et al. .................. 704/240 |
| 2004/0260562 A1 | 12/2004 | Kijirai |
| 2005/0075884 A1 | 4/2005 | Badt, Jr. |
| 2005/0091059 A1 | 4/2005 | Lecoeuche |
| 2005/0131701 A1 | 6/2005 | Cross |
| 2005/0138219 A1 | 6/2005 | Boughannam |
| 2005/0138647 A1 | 6/2005 | Boughannam |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger |
| 2005/0283367 A1 | 12/2005 | Cross |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Ativanichayaphong et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

* cited by examiner

CONTEXT-BASED GRAMMARS FOR AUTOMATED SPEECH RECOGNITION

BACKGROUND OF THE INVENTION

1. Field of the Invention

The field of the invention is data processing, or, more specifically, methods, apparatus, and products for providing a context-based grammar for automatic speech recognition ('ASR').

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

Current lightweight voice solutions require a developer to build a grammar and lexicon to limit the potential number of words that an ASR engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a decent level of confidence, recognize the name of the city spoken. In the case where there is no explicit context, such as a blank text field for inputting any search query, this speaker independent recognition fails because a reasonably sized vocabulary is not available.

SUMMARY OF THE INVENTION

The disclosed invention seeks to overcome the limitations of the current state of the art in speaker independent voice recognition by dynamically building voice recognition grammars based on the context of a user's activities in a multimodal application. Methods, apparatus, and computer program products are described for providing a context-based grammar for automatic speech recognition, including creating by a multimodal application a context, the context comprising words associated with user activity in the multimodal application, and supplementing by the multimodal application a grammar for automatic speech recognition in dependence upon the context.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
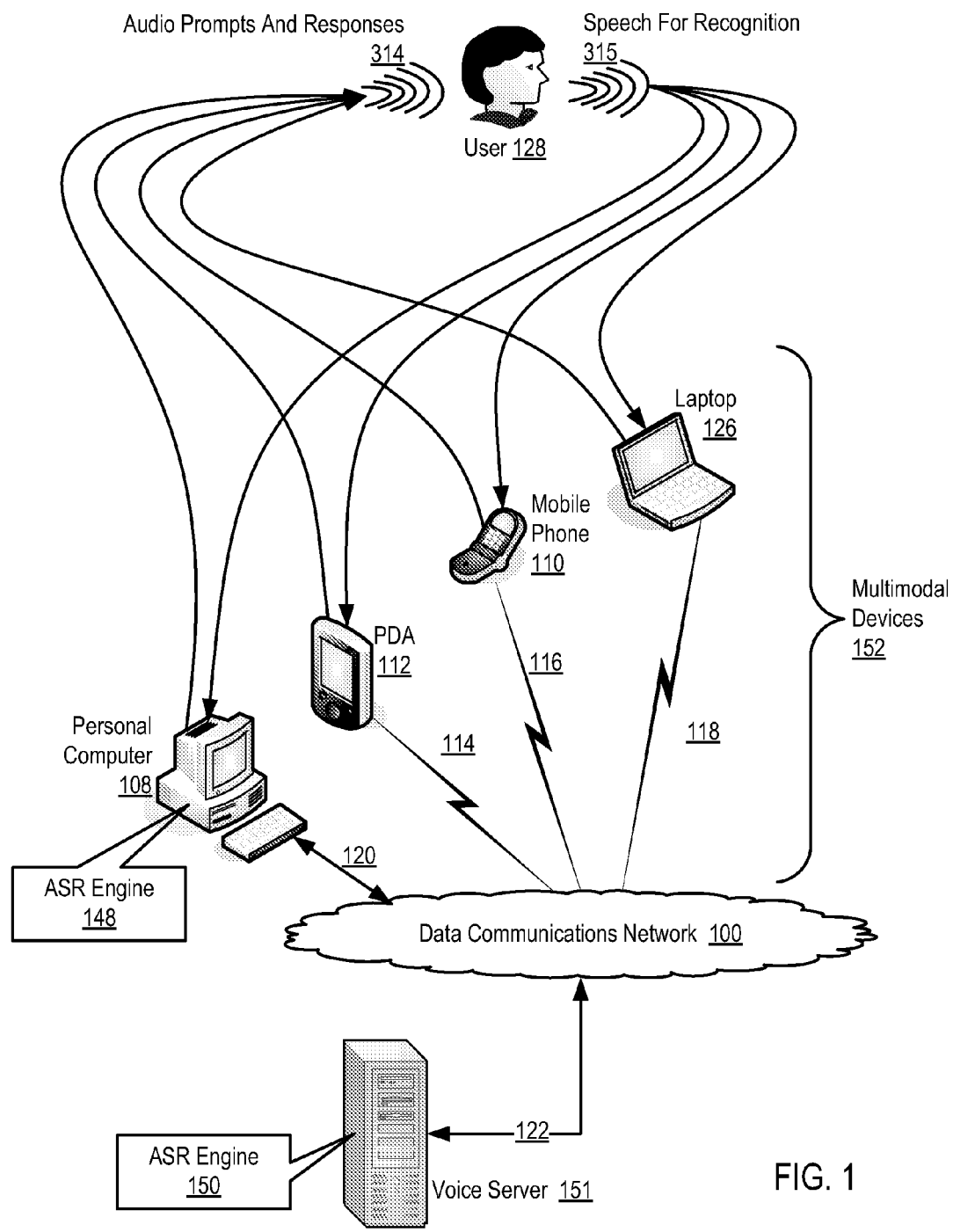
FIG. 1 sets forth a network diagram illustrating an exemplary system for providing a context-based grammar for automatic speech recognition according to embodiments of the present invention.

Exemplary methods, apparatus, and products for providing a context-based grammar for automatic speech recognition according to embodiments of the present invention are described with reference to the accompanying drawings, beginning with FIG. 1. FIG. 1 sets forth a network diagram illustrating an exemplary system for providing a context-based grammar for automatic speech recognition according to embodiments of the present invention. The system of FIG. 1 operates generally to provide a context-based grammar for automatic speech recognition according to embodiments of the present invention by creating by a multimodal application a context, the context comprising words associated with user activity in the multimodal application, and supplementing by the multimodal application a grammar for automatic speech recognition in dependence upon the context.

A multimodal device is an automated device, that is, automated computing machinery or a computer program running on an automated device, that is capable of accepting speech input from a user, digitizing speech, and providing digitized speech to an ASR engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art.

The system of FIG. 1 includes several example multimodal devices:
- personal computer (108) which is coupled for data communications to data communications network (100) through wireline connection (120),
- personal digital assistant ('PDA') (112) which is coupled for data communications to data communications network (100) through wireless connection (114),
- mobile telephone (110) which is coupled for data communications to data communications network (100) through wireless connection (116), and
- laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to an ASR engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled
    RTP Payload Format for European Telecommunications Standards Institute (ETSI) European Standard ES 201 108 Distributed Speech Recognition Encoding and the Internet Draft entitled
    RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for providing a context-based grammar for automatic speech recognition according to embodiments of the present invention may be encoded with any codec, including, for example:
- AMR (Adaptive Multi-Rate Speech coder)
- ARDOR (Adaptive Rate-Distortion Optimized sound codeR),
- Dolby Digital (A/52, AC3),
- DTS (DTS Coherent Acoustics),
- MP1 (MPEG audio layer-1),
- MP2 (MPEG audio layer-2) Layer 2 audio codec (MPEG-1, MPEG-2 and non-ISO MPEG-2.5),
- MP3 (MPEG audio layer-3) Layer 3 audio codec (MPEG-1, MPEG-2 and non-ISO MPEG-2.5),
- Perceptual Audio Coding,
- FS-1015 (LPC-10),
- FS-1016 (CELP),
- G.726 (ADPCM),
- G.728 (LD-CELP),
- G.729 (CS-ACELP),
- GSM,
- HILN (MPEG-4 Parametric audio coding), and
- others as may occur to those of skill in the art.

An ASR engine (148) may be installed locally in the multimodal device itself, or an ASR engine (150) may be installed remotely with respect to the multimodal device, across a data communications network (100) in a voice server (151). Each of the example multimodal devices (152) in the system of FIG. 1 is capable of providing a context-based grammar for automatic speech recognition according to embodiments of the present invention by creating by a multimodal application a context, the context comprising words associated with user activity in the multimodal application, and supplementing by the multimodal application a grammar for automatic speech recognition in dependence upon the context.

The use of these four example multimodal devices (152) is for explanation only, not for limitation of the invention. Any automated computing machinery capable of accepting speech from a user, providing the speech digitized to an ASR engine, and receiving and playing speech prompts and responses from the voice server may be improved to function as a multimodal device for providing a context-based grammar for automatic speech recognition according to embodiments of the present invention.

The system of FIG. 1 also includes a voice server (151) which is connected to data communications network (100) through wireline connection (122). The voice server (151) is a computer that runs a VoiceXML interpreter that provides voice recognition services for multimodal devices by accepting requests for speech recognition and returning text representing recognized speech. Voice server (151) also provides text to speech ('TTS') conversion for voice prompts and voice responses (314) to user input in multimodal applications such as, for example, X+V applications or Java voice applications.

The system of FIG. 1 includes a data communications network (100) that connects the multimodal devices (152) and the voice server (151) for data communications. A data communications network for providing a context-based grammar for automatic speech recognition according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The arrangement of the voice server (151), the multimodal devices (152), and the data communications network (100) making up the exemplary system illustrated in FIG. 1 are for explanation, not for limitation. Data processing systems useful for providing a context-based grammar for automatic speech recognition according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above.

Various embodiments of the present invention may be implemented on a variety of hardware platforms in addition to those illustrated in FIG. 1.

Providing a context-based grammar for automatic speech recognition according to embodiments of the present invention in some embodiments may be implemented with one or more voice servers, computers, that is, automated computing machinery, that provide speech recognition. For further explanation, therefore, FIG. 2 sets forth a block diagram of automated computing machinery comprising an example of a computer useful as a voice server (151) in providing a context-based grammar for automatic speech recognition according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a multimodal server application (188), a module of computer program instructions capable of operating a voice server in a system that is configured to provide a context-based grammar for automatic speech recognition according to embodiments of the present invention. Multimodal server application (188) provides voice recognition services for multimodal devices by accepting requests for speech recognition and returning speech recognition results, including text representing recognized speech, text for use as variable values in dialogs, and text as string representations of scripts for semantic interpretation. Multimodal server application (188) also includes computer program instructions that provide text-to-speech ('TTS') conversion for voice prompts and voice responses to user input in multimodal applications such as, for example, X+V applications or Java Speech applications. Multimodal server application (188) in this example is also configured to provide a context-based grammar for automatic speech recognition according to embodiments of the present invention by creating by a multimodal application a context, the context comprising words associated with user activity in the multimodal application, and supplementing by the multimodal application a grammar for automatic speech recognition in dependence upon the context.

Multimodal server application (188) in this example is a user-level, multimodal, server-side computer program that may be implemented with a set of VoiceXML documents which taken together comprise a VoiceXML application. Multimodal server application (188) may be implemented as a web server, implemented in Java, C++, or another language, that supports X+V by providing responses to HTTP requests from X+V clients. Multimodal server application (188) may, for a further example, be implemented as a Java server that runs on a Java Virtual Machine (102) and supports a Java voice framework by providing responses to HTTP requests from Java client applications running on multimodal devices. And multimodal server applications that support providing a context-based grammar for automatic speech recognition may be implemented in other ways as may occur to those of skill in the art, and all such ways are well within the scope of the present invention.

The multimodal server application (188) in this example is configured to receive speech for recognition from a user and pass the speech along to an ASR engine (150). ASR engine (150) is a module of computer program instructions, also stored in RAM in this example, that includes an ASR lexicon (106) of words capable of recognition by the ASR engine. The lexicon (106) is an association of words in text form with phonemes representing pronunciations of each word. In carrying out automated speech recognition, the ASR engine receives speech for recognition in the form of at least one digitized word, uses frequency components of the digitized word to derive a Speech Feature Vector ('SFV'), uses the SFV to infer phonemes for the word from a language-specific acoustic model (not shown). A language-specific acoustic model is a data structure, a table or database, for example, that associates SFVs with phonemes representing, to the extent that it is practically feasible to do so, all pronunciations of all the words in a particular language. The ASR engine then uses the phonemes to find the word in the lexicon.

The ASR engine (150) contains an grammar (104). A grammar communicates to an ASR engine the words and sequences of words that may be recognized. Grammars for use in providing a context-based grammar for automatic speech recognition according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

<grammar scope="dialog" ><![CDATA[
 #JSGF V1.0;
 grammar command;

-continued

```
    <command> = [remind me to] call | phone | telephone <name>
    <when>;
    <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine which words presently can be recognized. In this example, expansion includes conjunction and disjunction, and the vertical bars '|' mean 'or.' An ASR engine processes the rules in sequence, first <command>, then <name>, then <when>. The <command> rule matches 'call' or 'phone' or 'telephone' plus, that is, in conjunction with, whatever is returned from the <name> rule and the <when> rule. The <name> rule matches 'bob' or 'martha' or 'joe' or 'pete' or 'chris' or 'john' or 'artoush', and the <when> rule matches 'today' or 'this afternoon' or 'tomorrow' or 'next week.' The command grammar as a whole matches utterances like these, for example:

'phone bob next week,'
'telephone martha this afternoon,'
'remind me to call chris tomorrow,' and
'remind me to phone pete today.'

Also stored in RAM is a VoiceXML interpreter (192), a module of computer program instructions that processes VoiceXML grammars. VoiceXML input to VoiceXML interpreter (192) may originate from VoiceXML clients running remotely on multimodal devices, from X+V clients running remotely on multimodal devices, or from Java client applications running remotely on multimedia devices. In this example, VoiceXML interpreter (192) interprets and executes VoiceXML segments received from remote multimedia clients and provided to VoiceXML interpreter (192) through multimodal server application (188). Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), multimodal server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Figure 2:
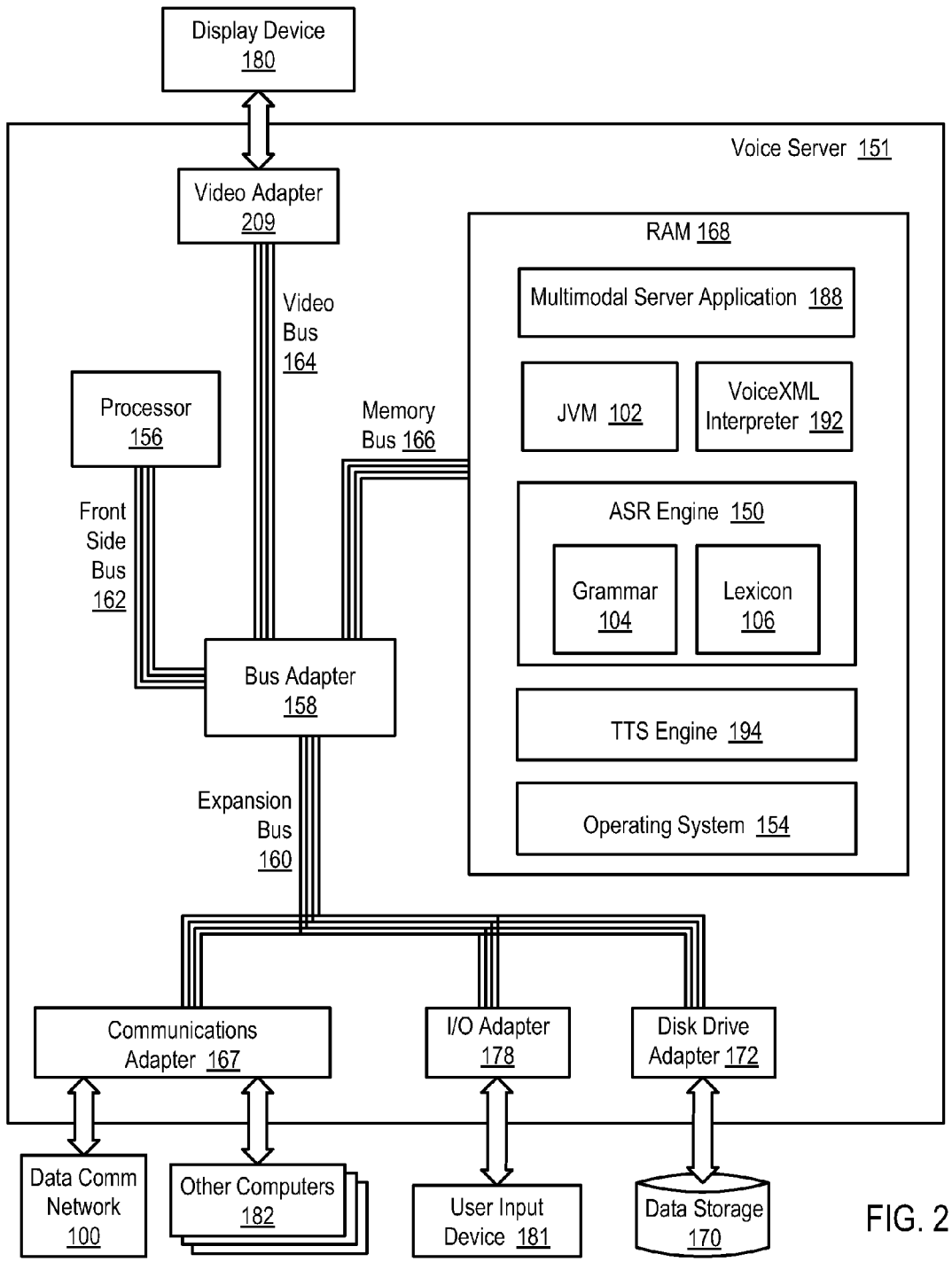
FIG. 2 sets forth a block diagram of automated computing machinery comprising an example of a computer useful as a voice server in providing a context-based grammar for automatic speech recognition according to embodiments of the present invention.

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for providing a context-based grammar for automatic speech recognition according to embodiments of the present invention include modems for wired dial-up communications, Ethernet (IEEE 802.3) adapters for wired data communications network communications, and 802.11 adapters for wireless data communications network communications.

Providing a context-based grammar for automatic speech recognition according to embodiments of the present invention is generally implemented with one or more multimodal devices, that is, automated computing machinery or computers. In the system of FIG. 1, for example, all the multimodal devices are implemented to some extent at least as computers. For further explanation, therefore, FIG. 3 sets forth a block diagram of automated computing machinery comprising an example of a computer useful as a multimodal device (152) in providing a context-based grammar for automatic speech recognition according to embodiments of the present invention. The multimodal device (152) of FIG. 3 includes at least one computer processor (156) or 'CPU' as well as random access memory (168) ('RAM') which is connected through a high speed memory bus (166) and bus adapter (158) to processor (156) and to other components of the multimodal device.

Stored in RAM (168) is a multimodal device application (195), a module of computer program instructions capable of operating a multimodal device as an apparatus that supports providing a context-based grammar for automatic speech recognition according to embodiments of the present invention. The multimodal device application (195) accepts speech for recognition from a user and sends the speech for recognition through API calls to an ASR engine (150). Multimodal device application (195) in this example is also configured to provide a context-based grammar for automatic speech recognition according to embodiments of the present invention by creating by a multimodal application a context, the context comprising words associated with user activity in the multimodal application, and supplementing by the multimodal application a grammar for automatic speech recognition in dependence upon the context.

Multimodal device application (195) typically is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal device application may be a Java voice application that itself process grammars and provides grammars and digitized speech for recognition directly through an API to an ASR engine (150). Or the multimodal device application may be an X+V application running in a browser or microbrowser that passes VoiceXML grammars through API calls directly to an embedded VoiceXML interpreter (192) for processing. The embedded VoiceXML interpreter (192) may in turn issue requests for speech recognition through API calls directly to an embedded ASR engine (150). Multimodal device application (195) also provides TTS conversion by API calls to an embedded TTS engine (194) for voice prompts and voice responses to user input in multimodal applications such as, for example, X+V applications or Java voice applications. The multimodal device application (195) in this example does not send speech for recognition across a network to a voice server for recognition, and the multimodal device application (195) in this example does not receive TTS prompts and responses across a network from a voice server. All grammar processing, voice recognition, and text to speech conversion in this example is performed in an embedded fashion in the multimodal device itself.

ASR engine (150), also stored in RAM in this example, is a module of computer program instructions for carrying out automated speech recognition. An example of an embedded ASR engine that may be improved for providing a context-based grammar for automatic speech recognition according to embodiments of the present invention is IBM's Embedded ViaVoice Enterprise, an ASR product that also includes an embedded TTS engine. The ASR engine (150) includes a grammar (104) that in turn as described above includes rules defining which words and sequences of words are presently scoped for recognition. The ASR engine (150) includes an ASR lexicon (106) of words capable of recognition by the ASR engine.

Also stored in RAM (168) is an embedded TTS Engine (194), a module of computer program instructions that accepts text as input and returns the same text in the form of digitally encoded speech, for use in providing speech as prompts for and responses to users of multimodal systems. TTS Engine (194) also supports providing a context-based grammar for automatic speech recognition according to embodiments of the present invention by providing a time-domain digitized form of a word spelled by a user to be added to the ASR lexicon (106).

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), multimodal device application (195), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Figure 3:
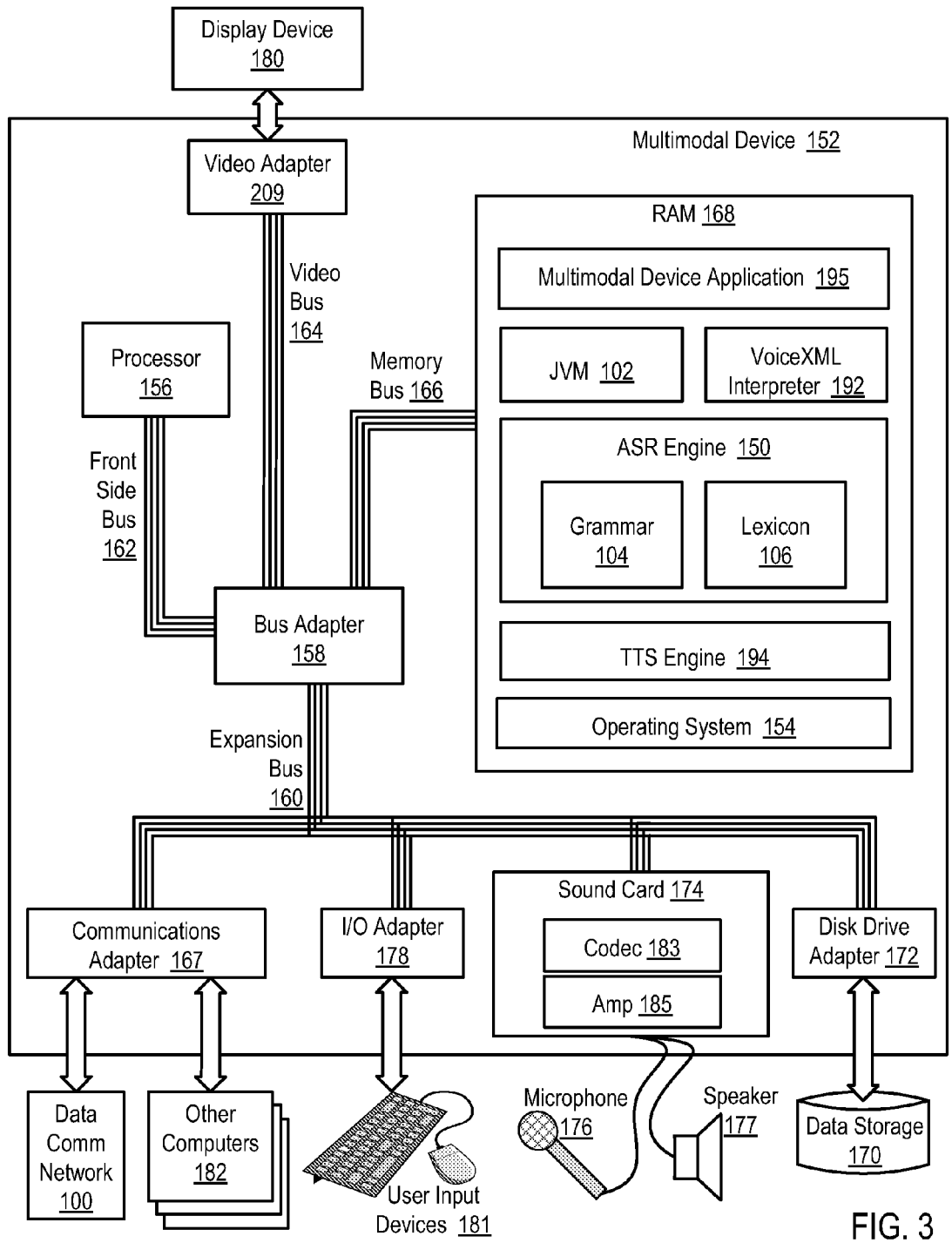
FIG. 3 sets forth a block diagram of automated computing machinery comprising an example of a computer useful as a multimodal device in providing a context-based grammar for automatic speech recognition according to embodiments of the present invention.

The multimodal device (152) of FIG. 3 includes a bus adapter (158), a computer hardware component that contains drive electronics for the high speed buses, the front side bus (162), the video bus (164), and the memory bus (166), as well as for the slower expansion bus (160). Examples of bus adapters useful in multimodal devices according to embodiments of the present invention include the Intel Northbridge, the Intel Memory Controller Hub, the Intel Southbridge, and the Intel I/O Controller Hub. Examples of expansion buses useful in multimodal devices according to embodiments of the present invention include Industry Standard Architecture ('ISA') buses and Peripheral Component Interconnect ('PCI') buses.

Multimodal device (152) of FIG. 3 includes disk drive adapter (172) coupled through expansion bus (160) and bus adapter (158) to processor (156) and other components of the multimodal device (152). Disk drive adapter (172) connects non-volatile data storage to the multimodal device (152) in the form of disk drive (170). Disk drive adapters useful in multimodal devices include Integrated Drive Electronics ('IDE') adapters, Small Computer System Interface ('SCSI') adapters, and others as will occur to those of skill in the art. In addition, non-volatile computer memory may be implemented for a multimodal device as an optical disk drive, electrically erasable programmable read-only memory space (so-called 'EEPROM' or 'Flash' memory), RAM drives, and so on, as will occur to those of skill in the art.

The example multimodal device of FIG. 3 includes one or more input/output ('I/O') adapters (178). I/O adapters in multimodal devices implement user-oriented input/output through, for example, software drivers and computer hardware for controlling output to display devices such as computer display screens, as well as user input from user input devices (181) such as keyboards and mice. The example multimodal device of FIG. 3 includes video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example multimodal device of FIG. 3 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

The exemplary multimodal device (152) of FIG. 3 includes a communications adapter (167) for data communications with other computers (182) and for data communications with data communications network (100). Such data communications may be carried out through serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for providing a context-based grammar for automatic speech recognition according to embodiments of the present invention include modems for wired dial-up communications, Ethernet (IEEE 802.3) adapters for wired data communications network communications, and 802.11b adapters for wireless data communications network communications.

Figure 4:
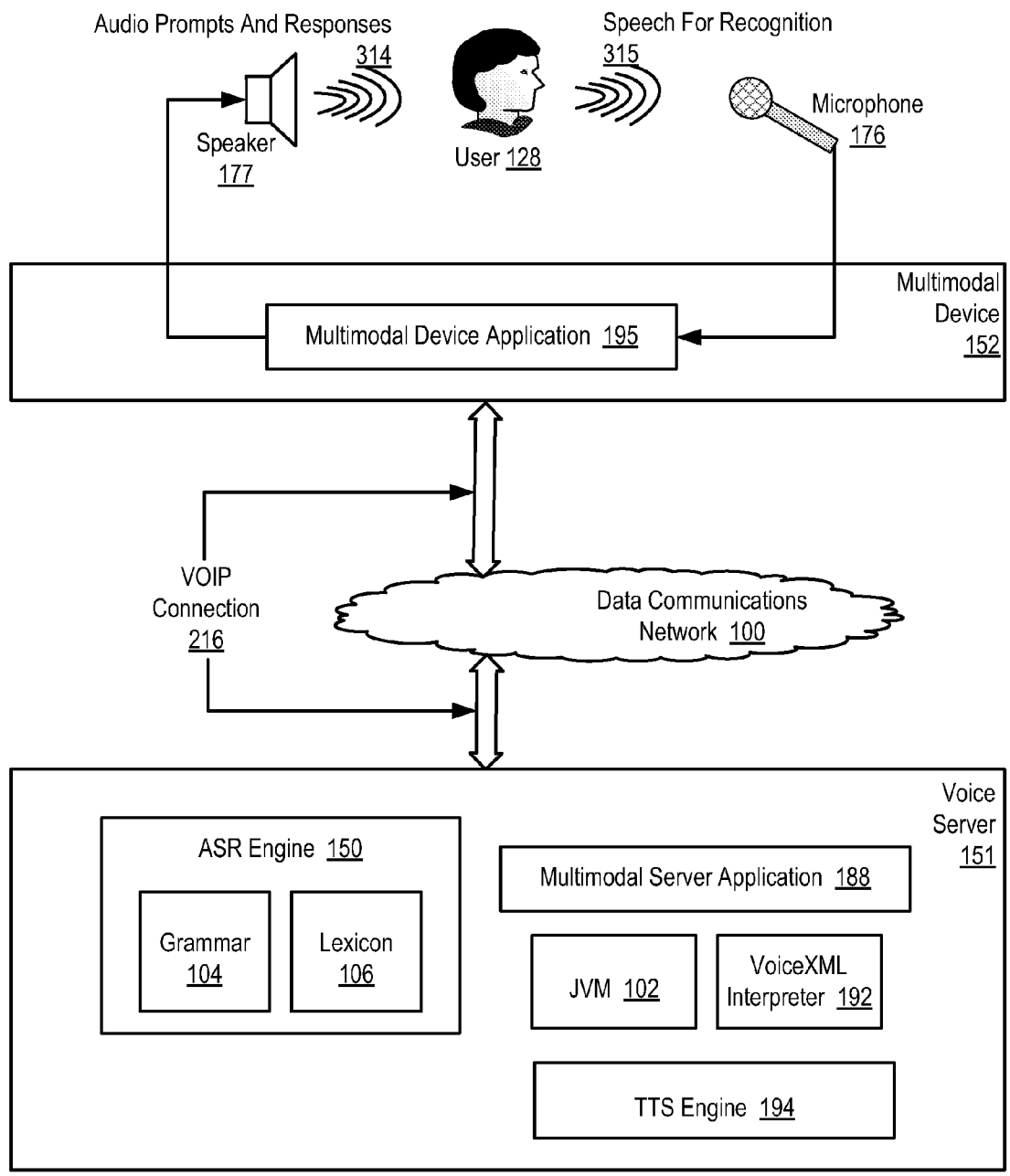
FIG. 4 sets forth a functional block diagram of exemplary apparatus for providing a context-based grammar for automatic speech recognition according to embodiments of the present invention.

For further explanation, FIG. 4 sets forth a functional block diagram of exemplary apparatus for providing a context-based grammar for automatic speech recognition according to embodiments of the present invention. The example of FIG. 4 includes a multimodal device (152) and a voice server (151) connected for data communication by a VOIP connection (216) through a data communications network (100). A multimodal device application (195) runs on the multimodal device (152), and a multimodal server application (188) runs on the voice server (151). The voice server (151) also has installed upon it an ASR engine (150) with an grammar (104) and an ASR lexicon (106), a JVM (102), and a Voice XML interpreter (192).

VOIP, standing for 'Voice Over Internet Protocol,' is a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 4 operates in a manner that is similar to the operation of the system of FIG. 2 described above. Multimodal device application (195) presents a voice interface to user (128), providing audio prompts and responses (314) and accepting speech for recognition (315). Multimodal device application (195) digitizes the speech for recognition according to some codec, packages the speech in a recognition request message according to a VOIP protocol, and transmits the speech to voice server (151) through the VOIP connection (216) on the network (100). Multimodal server application (188) provides voice recognition services for multimodal devices by accepting requests for speech recognition and returning speech recognition results, including text representing recognized speech, text for use as variable values in dialogs, and text as string representations of scripts for semantic interpretation. Multimodal server application (188) includes computer program instructions that provide text-to-speech ('TTS') conversion for voice prompts and voice responses to user input in multimodal applications such as, for example, X+V applications or Java Speech applications.

The multimodal server application (188) receives speech for recognition from a user and passes the speech to an ASR engine (150) for recognition. The ASR engine receives digitized speech for recognition, uses frequency components of the digitized speech to derive an SFV, uses the SFV to infer phonemes for the word from a language-specific acoustic model (not shown), and uses the phonemes to find the speech in the lexicon (106). In addition in this example, multimodal server application (188) is configured to provide a context-based grammar for automatic speech recognition according to embodiments of the present invention by creating by a multimodal application a context, the context comprising words associated with user activity in the multimodal application, and supplementing by the multimodal application a grammar for automatic speech recognition in dependence upon the context.

VoiceXML interpreter (192) is a module of computer program instructions that processes VoiceXML grammars. In this example, VoiceXML interpreter (192) interprets and executes VoiceXML grammars received from the multimodal device application and provided to VoiceXML interpreter (192) through multimodal server application (188). VoiceXML input to VoiceXML interpreter (192) may originate from the multimodal device application (195) implemented as a VoiceXML client running remotely the multimodal device (152), from the multimodal device application (195) implemented as an X+V client running remotely on the multimodal device (152), or from the multimedia device application (195) implemented as a Java client application running remotely on the multimedia device (152).

The TTS Engine (194) is a module of computer program instructions that in addition to providing digitized speech for use as prompts for and responses (314) to user (128), also supports providing a context-based grammar for automatic speech recognition according to embodiments of the present invention by providing a time-domain digitized form of a word spelled by a user to be added to the ASR lexicon (106).

Figure 5:
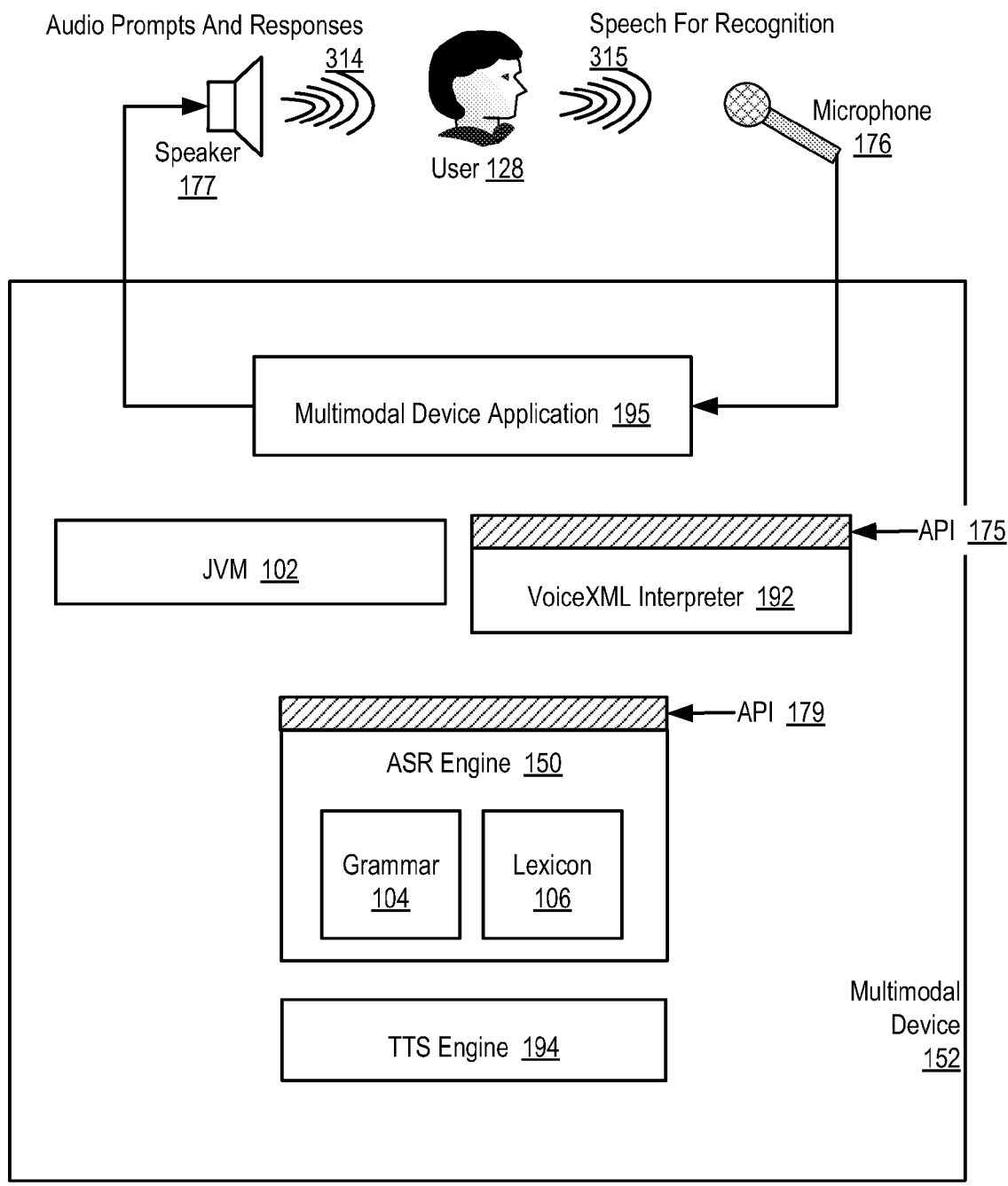
FIG. 5 sets forth a functional block diagram of further exemplary apparatus for providing a context-based grammar for automatic speech recognition according to embodiments of the present invention.

For further explanation, FIG. 5 sets forth a functional block diagram of further exemplary apparatus for providing a context-based grammar for automatic speech recognition according to embodiments of the present invention. In the example of FIG. 5, there is only a multimodal device (152) and a user (128), no network, no VOIP connection, and no voice server containing a remote ASR engine. All the components needed for providing a context-based grammar for automatic speech recognition according to embodiments of the present invention are installed or embedded in the multimodal device itself, a laptop, a PDA, a cell phone, or the like.

The apparatus of FIG. 5 operates in a manner similar to the system of FIG. 3. Multimodal device application (195) is a module of computer program instructions capable of operating a multimodal device as an apparatus that provides a context-based grammar for automatic speech recognition according to embodiments of the present invention. The multimodal device application (195) accepts speech for recognition from a user and sends the speech for recognition through API (179) to an embedded ASR engine (150). In addition in this example, multimodal device application (195) in this example is also configured to provide a context-based grammar for automatic speech recognition according to embodiments of the present invention by creating by a multimodal application a context, the context comprising words associated with user activity in the multimodal application, and supplementing by the multimodal application a grammar for automatic speech recognition in dependence upon the context.

Multimodal device application (195) is a user-level, multimodal, client-side computer program that provides a speech interface through which a user may provide oral speech for recognition through microphone (176), have the speech digitized through an audio amplifier and a codec, and provide the digitized speech for recognition to the embedded ASR engine (150). The multimodal device application may be a Java voice application that itself process grammars and provides grammars and digitized speech for recognition directly through API (179) to the embedded ASR engine (150). Or the multimodal device application may be an X+V application running in a browser or microbrowser that passes VoiceXML grammars through API (175) to an embedded VoiceXML interpreter (192) for processing. The embedded VoiceXML interpreter (192) may in turn issue requests for speech recognition through API (179) to the embedded ASR engine (150). Multimodal device application (195) also provides TTS conversion by API calls to an embedded TTS engine (194) for voice prompts and voice responses to user input in multimodal applications such as, for example, X+V applications or Java voice applications. The multimodal device application (195) in this example does not send speech for recognition across a network to a voice server for recognition, and the multimodal device application (195) in this example does not receive TTS prompts and responses across a network from a voice server. All grammar processing, voice recognition, and text to speech conversion is performed in an embedded fashion in the multimodal device itself.

Embedded ASR engine (150) is a module of computer program instructions for carrying out automated speech recognition. As mentioned, IBM's Embedded ViaVoice Enterprise, an ASR product that also includes an embedded TTS engine, is an example of an embedded ASR engine that may be improved for providing a context-based grammar for automatic speech recognition according to embodiments of the present invention. The ASR engine (150) includes an grammar (104) that in turn includes rules defining which words and sequences of words are presently scoped for recognition. The ASR engine (150) includes an ASR lexicon (106) of words capable of recognition by the ASR engine.

The embedded TTS Engine (194) is a module of computer program instructions that in addition to providing digitized speech for use as prompts for and responses to user (128), also supports providing a context-based grammar for automatic speech recognition according to embodiments of the present invention by providing a time-domain digitized form of a word spelled by a user to be added to the ASR lexicon (106).

Figure 6:
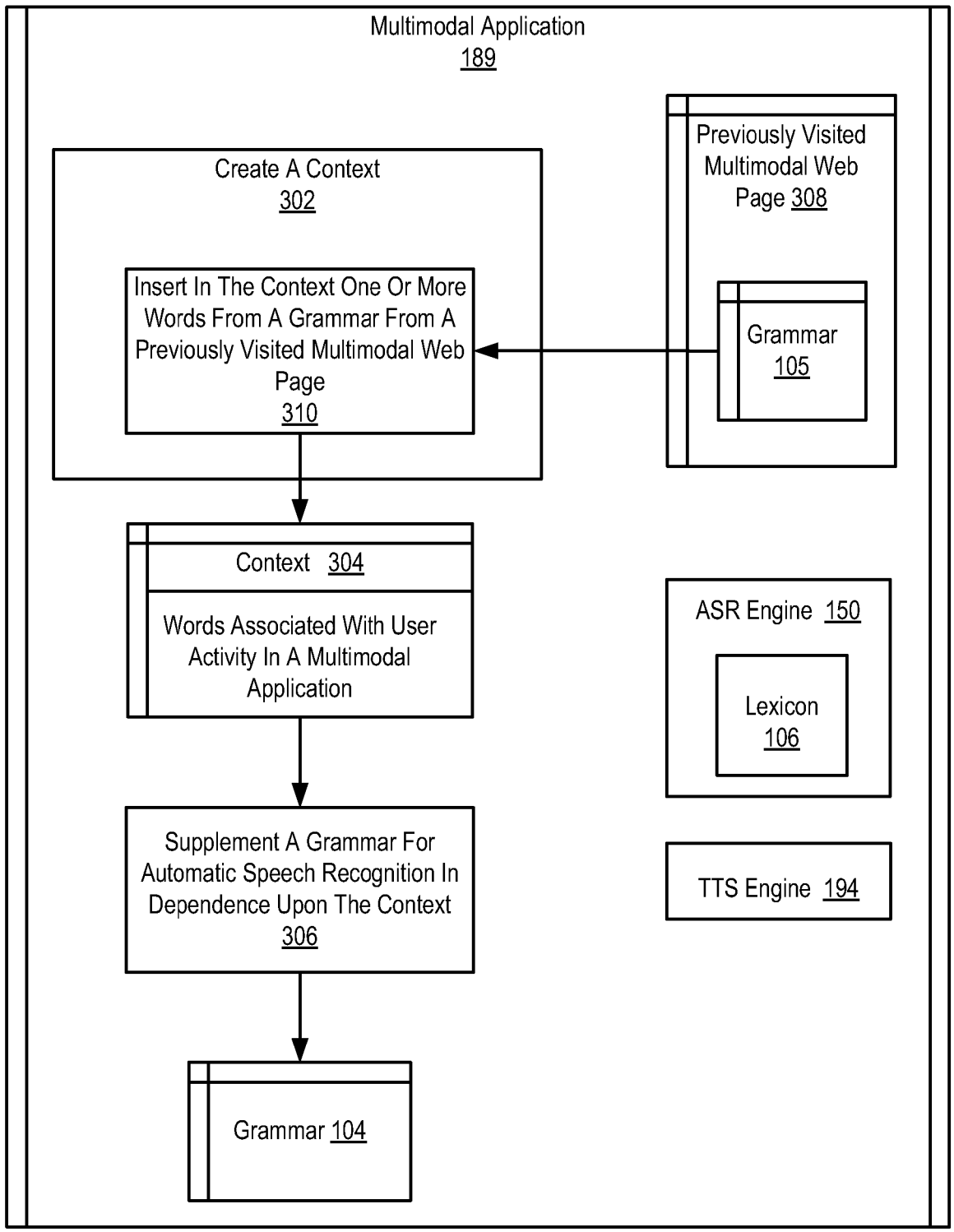
FIG. 6 sets forth a flow chart illustrating an exemplary method of providing a context-based grammar for automatic speech recognition according to embodiments of the present invention.

For further explanation, FIG. 6 sets forth a flow chart illustrating an exemplary method of providing a context-based grammar for automatic speech recognition according to embodiments of the present invention. The method of FIG. 6 includes creating (302) by a multimodal application (189) a context (304). The multimodal application (189) may be a multimodal server application like the one described above with regard to reference (188) on FIG. 4. The multimodal application (189) may be a multimodal device application like the one described above with regard to reference (195) on FIG. 5. Or the multimodal application (189) may be any other multimodal application as may occur to those of skill in the art. The context (304) is implemented as a data structure in which is stored words associated with user activity in the multimodal application, for example, words uttered by a user as speech for recognition or words found on web sites previously visited by the user in operating the multimodal application. The context (304) may be implemented as any data structure as may occur to those of skill in the art that is useful for storing words as computer data, a flat file, a linked list in RAM, a table, and so on.

In the method of FIG. 6, creating (310) a context is carried out by inserting (310) in the context one or more words from a grammar (105) from a previously visited multimodal web page (308). In this example, the previously visited web pages are multimodal in the sense that they contain grammars that in turn contain words that are capable of being inserted into a context and later used for insertion from the context into another grammar.

The method of FIG. 6 also includes supplementing (306) by the multimodal application (189) a grammar (104) for automatic speech recognition in dependence upon the context (304). The multimodal application (189) supplements (306) a grammar (104) in dependence upon the context (304) by adding to the grammar (104) words from the context (304) and then instructing an ASR engine (150) to compile the grammar into a lexicon (106) to assure that all the words now in the grammar are also in the lexicon that supports recognition of words in that particular grammar. The embedded ASR engine may compile the grammar by converting with a TTS engine (194) the entire grammar into time-domain digitized words, converting the digitized words to the frequency domain, defining SFVs for the words, inferring phonemes for the words from a language-specific acoustic model, and inserting the text forms of the words and the phonemes for the words into the lexicon.

Figure 7:
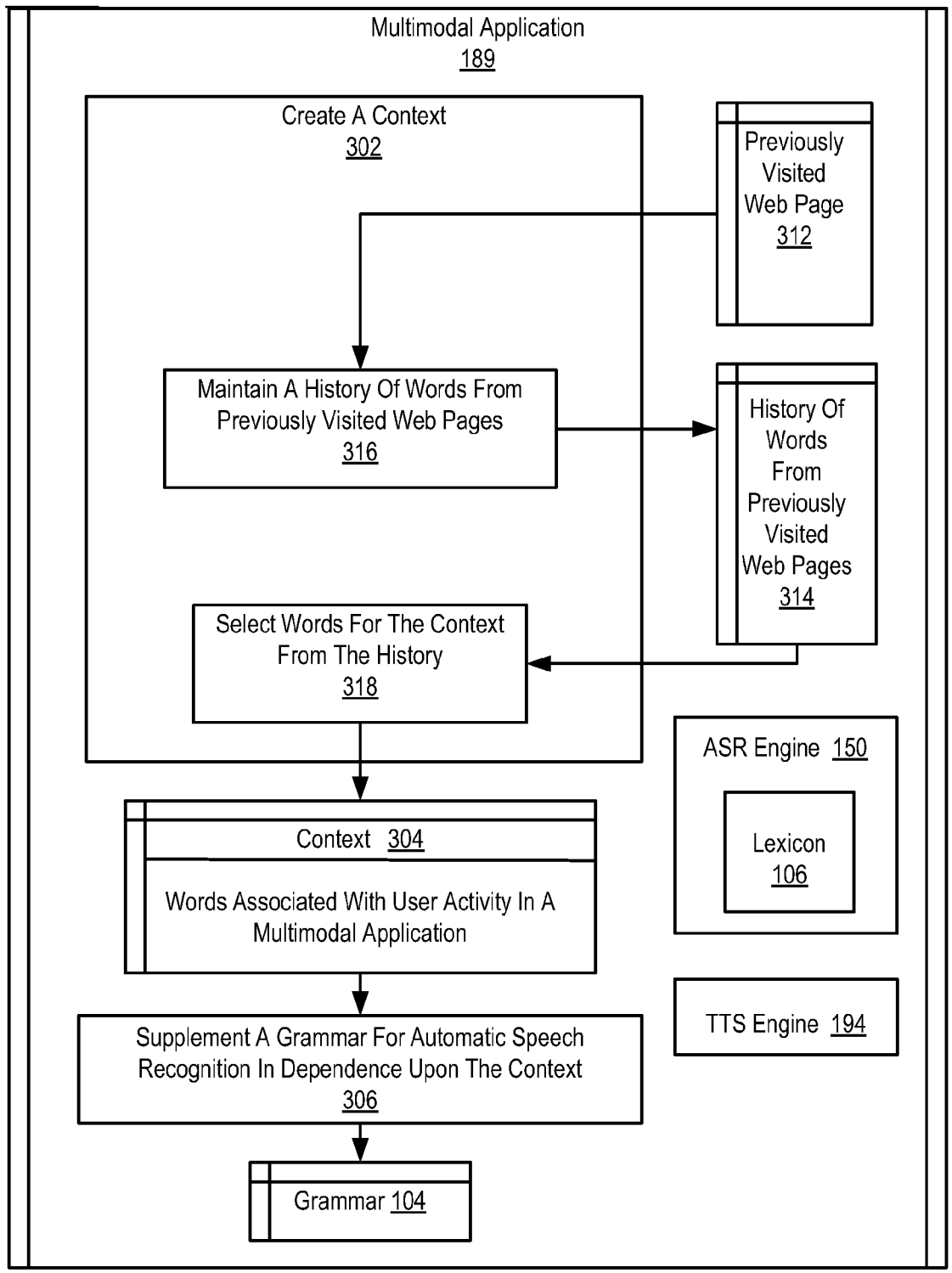
FIG. 7 sets forth a flow chart illustrating a further exemplary method of providing a context-based grammar for automatic speech recognition according to embodiments of the present invention.

For further explanation, FIG. 7 sets forth a flow chart illustrating a further exemplary method of providing a context-based grammar for automatic speech recognition according to embodiments of the present invention. In the method of FIG. 7, multimodal application (189) supplements (306) a grammar (104) for automatic speech recognition in dependence upon the context (304) as described above in the method of FIG. 6. That is, the multimodal application (189) adds words from the context (304) to the grammar (104), instructs an ASR engine (150) to compile the grammar into a lexicon (106), and so on, as described above.

In the method of FIG. 7, however, creating (302) a context is implemented by maintaining (316) a history (314) of words from previously visited web pages (312) and selecting (318) words for the context from the history. The web pages contain words. In this example, words are taken directly from any web page text, not exclusively from a grammar of a web page. So in this example the previously visited web pages may not be multimodal web pages. The history (314) is implemented as a data structure in which is stored words from previously visited web pages. The history (314) may be implemented as any data structure as may occur to those of skill in the art that is useful for storing words as computer data, a flat file, a linked list in RAM, a table, and so on.

Figure 8:
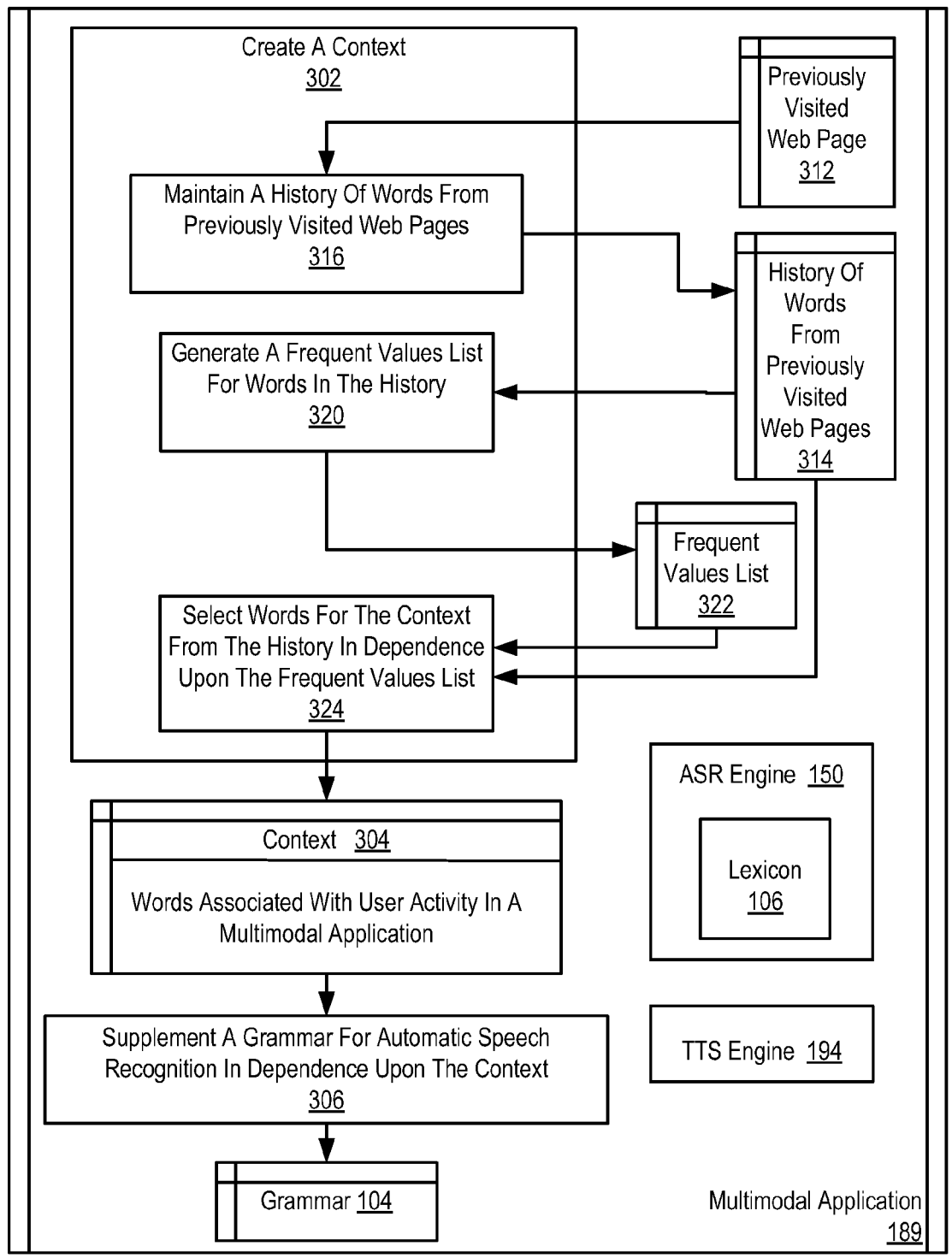
FIG. 8 sets forth a flow chart illustrating a further exemplary method of providing a context-based grammar for automatic speech recognition according to embodiments of the present invention.

For further explanation, FIG. 8 sets forth a flow chart illustrating a further exemplary method of providing a context-based grammar for automatic speech recognition according to embodiments of the present invention. In the method of FIG. 8, multimodal application (189) supplements (306) a grammar (104) for automatic speech recognition in dependence upon the context (304) as described above in the method of FIG. 6. That is, the multimodal application (189) adds words from the context (304) to the grammar (104), instructs an ASR engine (150) to compile the grammar into a lexicon (106), and so on, as described above.

In the method of FIG. 8, however, creating (302) a context (304) is carried out by maintaining (316) a history (314) of words from previously visited web pages (312), generating (320) a frequent values list (322) for words in the history, and selecting (324) words for the context from the history in dependence upon the frequent values list. The frequent values list (322) associates each word in the list with a count of the number of times the word occurs in the previously visited web pages. The frequent values list (322) is implemented as a data structure in which is stored words from previously visited web pages along with associated counts of occurrences. The frequent values list (322) may be implemented as any data structure as may occur to those of skill in the art that is useful for storing words as computer data in association with counts of occurrences, a flat file, a linked list in RAM, a table, and so on.

Selecting (324) words for the context from the history in dependence upon the frequent values list may be carried out by selecting words having occurrence counts exceeding a predetermined threshold. The multimodal application (189) may, for example, select only words that occur at least five times in the previously visited web pages, thereby improving the relevance of words used to supplement (306) the grammar (104).

Figure 9:
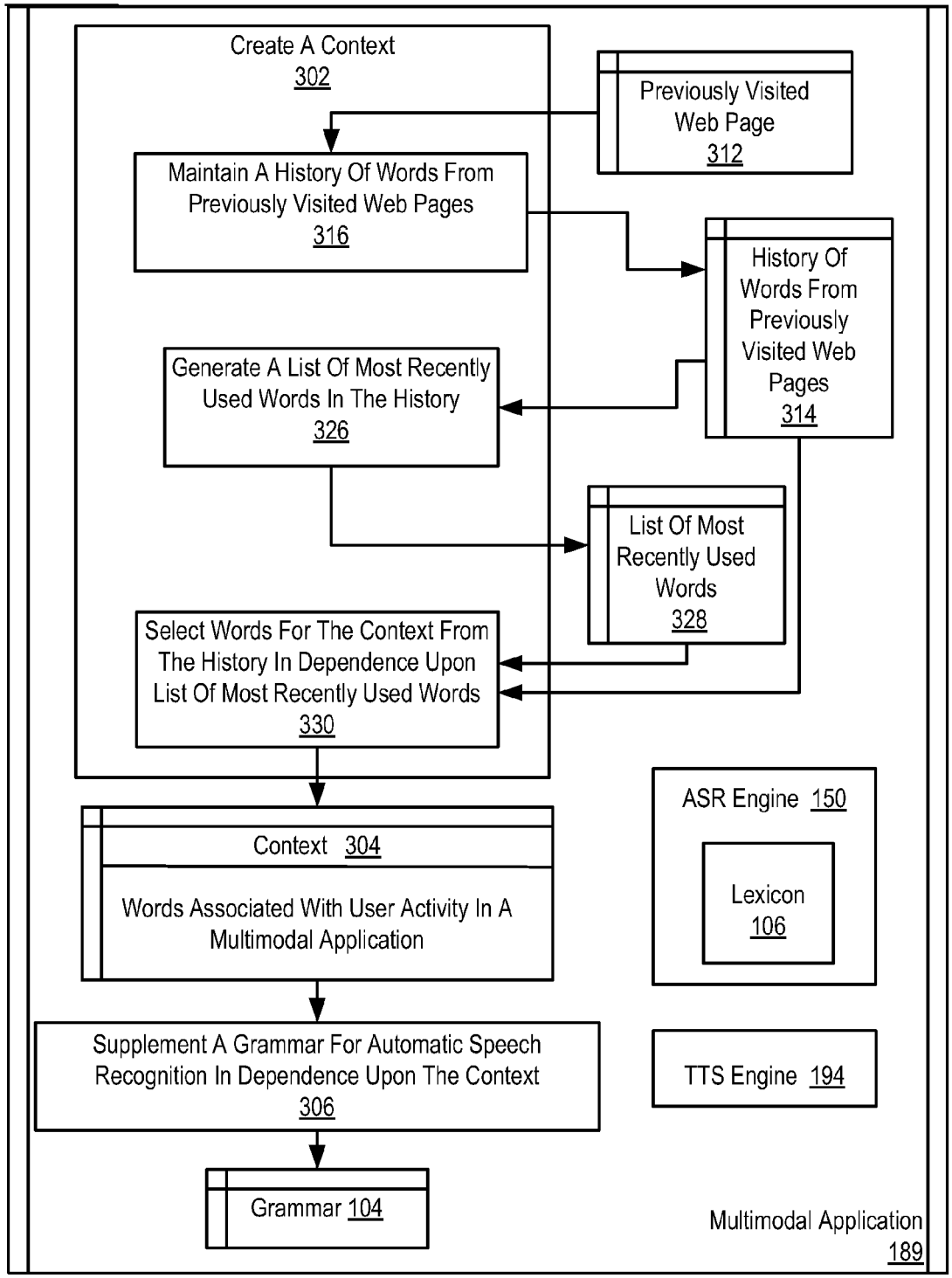
FIG. 9 sets forth a flow chart illustrating a further exemplary method of providing a context-based grammar for automatic speech recognition according to embodiments of the present invention.

For further explanation, FIG. 9 sets forth a flow chart illustrating a further exemplary method of providing a context-based grammar for automatic speech recognition according to embodiments of the present invention. In the method of FIG. 9, multimodal application (189) supplements (306) a grammar (104) for automatic speech recognition in dependence upon the context (304) as described above in the method of FIG. 6. That is, the multimodal application (189) adds words from the context (304) to the grammar (104), instructs an ASR engine (150) to compile the grammar into a lexicon (106), and so on, as described above.

In the method of FIG. 9, however, creating (302) a context (304) is carried out by maintaining (316) a history (314) of words from previously visited web pages (312), generating (326) a list (328) of most recently used words in the history, and selecting (330) words for the context (304) from the history in dependence upon the list of most recently used words. Generating (326) a list of most recently used words in the history may be implemented by storing words from previously visited web pages in association with time stamps indicating the most recent time when a user uttered the word as speech for recognition and the word was recognized by the ASR engine (150). The list (328) of most recently used words is implemented as a data structure in which is stored words from previously visited web pages along with associated usage times. The list (328) of most recently used words may be implemented as any data structure as may occur to those of skill in the art that is useful for storing words as computer data in association with usage times, that is, a flat file, a linked list in RAM, a table, and so on.

Selecting (330) words for the context (304) from the history in dependence upon the list of most recently used words may be carried out by selecting words having usage times no earlier than a predetermined threshold. The multimodal application (189) may, for example, select only words that have been used within the last five minutes, thereby improving the relevance of words used to supplement (306) the grammar (104).

Figure 10:
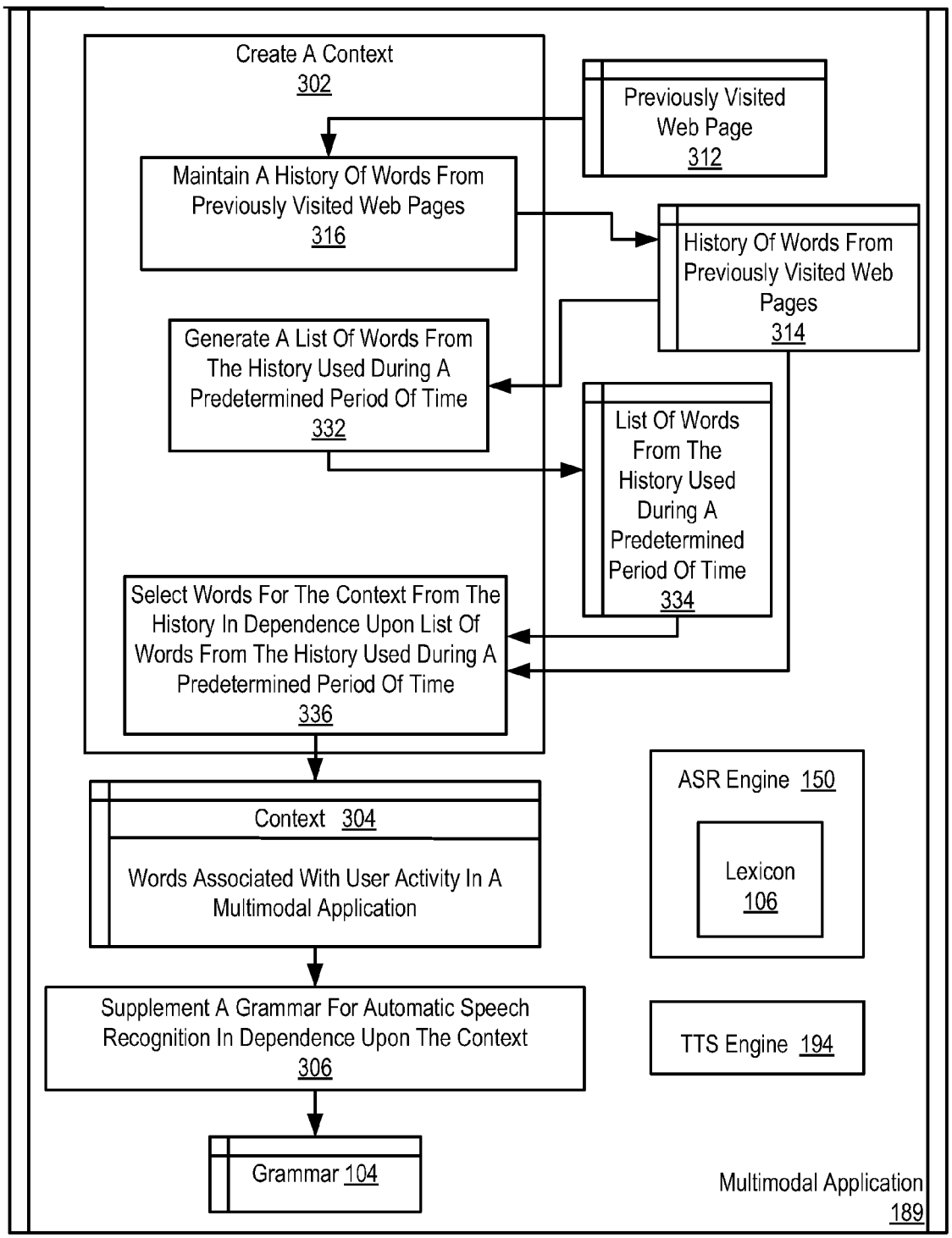
FIG. 10 sets forth a flow chart illustrating a further exemplary method of providing a context-based grammar for automatic speech recognition according to embodiments of the present invention.

For further explanation, FIG. 10 sets forth a flow chart illustrating a further exemplary method of providing a context-based grammar for automatic speech recognition according to embodiments of the present invention. In the method of FIG. 10, multimodal application (189) supplements (306) a grammar (104) for automatic speech recognition in dependence upon the context (304) as described above in the method of FIG. 6. That is, the multimodal application (189) adds words from the context (304) to the grammar (104), instructs an ASR engine (150) to compile the grammar into a lexicon (106), and so on, as described above.

In the method of FIG. 10, however, creating (302) a context (304) further comprises maintaining (316) a history (314) of words from previously visited web pages (312), generating (332) a list (334) of words from the history used during a predetermined period of time, and selecting (336) words for the context (304) from the history (314) in dependence upon the list (334) of words from the history used during a predetermined period of time. Generating (332) a list (334) of words from the history used during a predetermined period of time may be implemented by storing words from previously visited web pages in association with time stamps indicating when a user uttered the word as speech for recognition and the word was recognized by the ASR engine (150). In this way, multiple instances of the word are recorded if the word is spoken and recognized more than once during the period. The list (334) of words from the history used during a predetermined period of time is implemented as a data structure in which is stored words from previously visited web pages along with associated usage times. The list (334) of words from the history used during a predetermined period of time may be implemented as any data structure as may occur to those of skill in the art that is useful for storing words as computer data in association with usage times, that is, a flat file, a linked list in RAM, a table, and so on.

Selecting (336) words for the context (304) from the history (314) in dependence upon the list (334) of words from the history used during a predetermined period of time may be carried out by setting the predetermined period to improve the relevance of words used to supplement (306) the grammar (104). During the work week, when a user is using a multimodal application such as a multimodal browser primarily for work-related tasks, the user may set the predetermined period as Monday morning through Friday afternoon, thereby supplementing the grammar during the work week with work-related words. During the weekend, when a user is using a multimodal application such as a multimodal browser primarily for recreational purposes, the user may set the predetermined period as Friday evening through Sunday evening, thereby supplementing the grammar over the weekend with hobby-related words.

Figure 11:
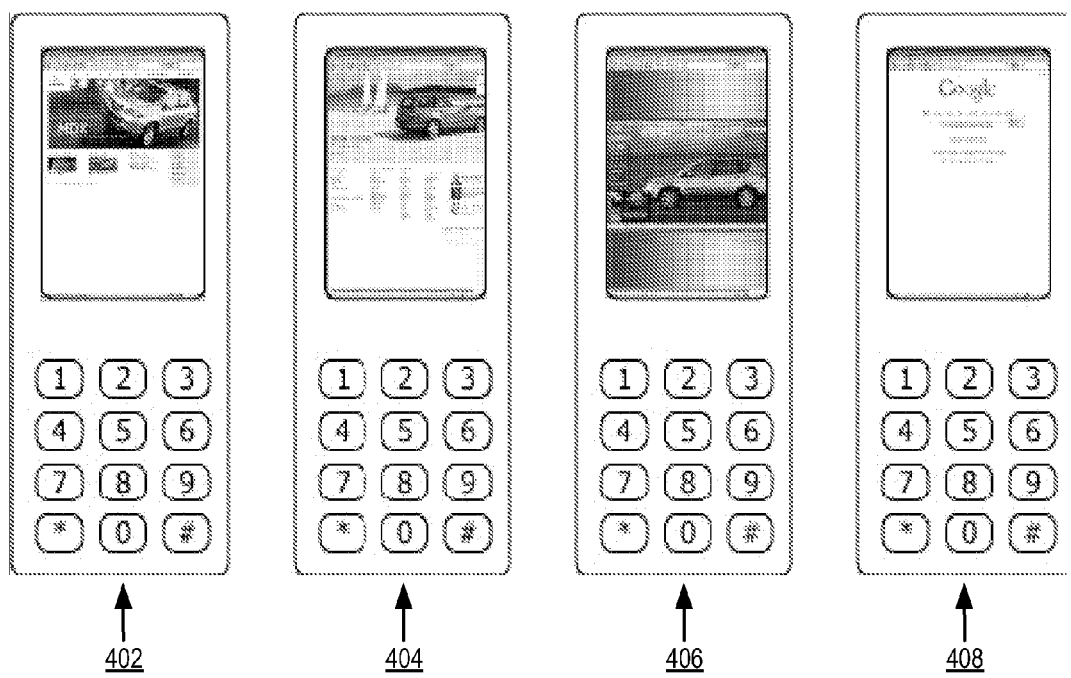
FIG. 11 sets forth a line drawing illustrating an exemplary use case of providing a context-based grammar for automatic speech recognition according to embodiments of the present invention.

For further explanation, FIG. 11 sets forth a line drawing illustrating an exemplary use case of providing a context-based grammar for automatic speech recognition according to embodiments of the present invention. The use case of FIG. 11 includes user activity with a microbrowser on a cell phone navigating to four X+V web sites, an Acura dealership web site (402), a BMW dealership web site (404), a Volvo dealership web site, and the Google™ web site (408). From the Acura web site, possible spoken queries include:

"Show me a quote for an RL"
"Compare the Acura RL and the BMW Z4"
"Find an Acura Dealer in Palm Beach, Florida"

These could be implemented with the following grammar in an X+V page:

```
<command> = <quote> | <compare> | <find-dealer>
<quote> = [Show|Display ] [a] quote [for] [a|an] <model>
<compare> = Compare [a|an] <model> and [a|an] <model>
<find-dealer> = Find|show [a] dealer [in] <location>
<model> = [Acura] RL|TL|RSX|TSX|MDX
<location> = <city> |<city> <state> | <zipcode>
```

The automobile dealership web sites are examples of domain-specific web sites, web sites dedicated to a particular subject matter. The Google web site is a generic search page;

it supports searches for anything—with no domain specificity. A generic search page is a web page that operates a search engine such as Google™, Yahoo™, or Ask.com™, having a generic search data entry field, that is, a data entry field that supports no more than general search commands such as, for example, "search" or "find" or "go." That is, the supported voice search commands in a generic search page include no domain-specific voice commands, no voice commands to search for automobile parts or wool socks or linen table napkins.

As pages are visited in the domain-specific automobile web sites, the grammars, or words from the grammars, that are in the X+V pages are stored in a context so that they could all be used to supplement a grammar at a generic search page. Then the utterance "Compare the Acura RL and the BMW Z4" or "Find an Acura Dealer in Palm Beach, Fla." may be recognized and entered as a search term in a generic search field of a generic search page.

Additionally, a multimodal application that collects vocabulary from history could build a grammar by accumulating keywords, as in the following:

```
<search> = [search|find|look for] <search-string>
<search-string> = <keyword> [<keyword>]*
<keyword> = Acura|NSX|RSX|TSX|transmission|brakes|steering|
    alloy|Volvo|S80|S60|S40|X90|roof rack|traction ...
```

So that following the user's web history above, the generic search page could recognize a phrase such as: "Look for Acura roof racks."

In view of the explanations set forth above in this paper, readers will recognize that providing a context-based grammar for automatic speech recognition according to embodiments of the present invention overcomes the limitations of the current state of the art in speaker independent voice recognition by dynamically building grammars based on the context of a user's activities. A system that provides a context-based grammar for automatic speech recognition according to embodiments of the present invention augments existing speaker independent voice recognition engines by dynamically providing grammars, where they are otherwise unavailable, based on the users previous context of activity on the system. For a user who spent the last few minutes browsing automobile web sites, for example, now opens a Google™ search window, a system that provides a context-based grammar for automatic speech recognition according to embodiments of the present invention effectively assumes that the search is related to automobiles and provides a voice recognition grammar that contains car names, makes, models, along with various other terms encountered in users browsing. As another example: For a user interacting with a system management console for a Z System mainframe who moves to a user group web site to do a search, the grammar for voice commands in that search box would be generated based on the text encountered in the system management console.

Exemplary embodiments of the present invention are described largely in the context of a fully functional computer system for providing a context-based grammar for automatic speech recognition. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone data communications networks for voice communications and digital data communications data communications networks such as, for example, Ethernets™ and data communications networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing a context-based grammar for automatic speech recognition at a first web page, the method comprising:
    creating by a multimodal application a context, the context comprising words taken from at least one second web page different from the first web page, and/or taken from at least one grammar for the at least one second web page, wherein creating the context comprises maintaining a history of at least some words from previously visited web pages, generating occurrence counts for words in the history, and selecting words for the context based at least in part on the occurrence counts; and
    supplementing by the multimodal application a grammar and/or lexicon for automatic speech recognition at the first web page in dependence upon the context.

2. The method of claim 1, wherein creating the context further comprises inserting in the context one or more words from a grammar from a previously visited multimodal web page.

3. The method of claim 1, wherein creating the context further comprises selecting words for the context from the history.

4. The method of claim 1, wherein creating the context further comprises generating a frequent values list for words in the history, and selecting words for the context from the history in dependence upon the frequent values list.

5. The method of claim 1, wherein creating the context further comprises generating a list of most recently used words in the history, and selecting words for the context from the history in dependence upon the list of most recently used words.

6. The method of claim 1, wherein creating the context further comprises generating a list of words from the history used during a predetermined period of time, and selecting words for the context from the history in dependence upon the list of words from the history used during a predetermined period of time.

7. The method of claim 1, wherein the grammar is a VoiceXML grammar.

8. The method of claim 1, wherein the multimodal application runs on a voice server.

9. The method of claim 1, further comprising:
inferring at least one phoneme for at least one word in the grammar using text to speech conversion; and
adding the at least one phoneme for the at least one word to the lexicon.

10. The method of claim 1, wherein the context comprises words taken from the at least one second web page.

11. The method of claim 1, wherein the context comprises words taken from at least one grammar for the at least one second web page.

12. A system for providing a context-based grammar for automatic speech recognition at a first web page, the system comprising a computer processor and a computer memory operatively coupled to the computer processor, the computer memory having disposed within it computer program instructions capable of:
creating by a multimodal application a context, the context comprising words taken from at least one second web page different from the first web page, and/or taken from at least one grammar for the at least one second web page, wherein creating the context comprises maintaining a history of at least some words from previously visited web pages, generating occurrence counts for words in the history, and selecting words for the context based at least in part on the occurrence counts; and
supplementing by the multimodal application a grammar and/or lexicon for automatic speech recognition at the first web page in dependence upon the context.

13. The system of claim 12, wherein creating the context further comprises inserting in the context one or more words from a grammar from a previously visited multimodal web page.

14. The system of claim 12, wherein creating the context further comprises selecting words for the context from the history.

15. The system of claim 12, wherein creating the context further comprises generating a frequent values list for words in the history, and selecting words for the context from the history in dependence upon the frequent values list.

16. The system of claim 12, wherein creating the context further comprises generating a list of most recently used words in the history, and selecting words for the context from the history in dependence upon the list of most recently used words.

17. The system of claim 12, wherein creating the context further comprises generating a list of words from the history used during a predetermined period of time, and selecting words for the context from the history in dependence upon the list of words from the history used during a predetermined period of time.

18. The system of claim 12, wherein the grammar is a VoiceXML grammar.

19. The system of claim 12, wherein the multimodal application runs on a voice server.

20. The system of claim 12, wherein the computer program instructions are further capable of:
inferring at least one phoneme for at least one word in the grammar using text to speech conversion; and
adding the at least one phoneme for the at least one word to the lexicon.

21. The system of claim 12, wherein the context comprises words taken from the at least one second web page.

22. The system of claim 12, wherein the context comprises words taken from at least one grammar for the at least one second web page.

23. A computer program product for providing a context-based grammar for automatic speech recognition at a first web page, the computer program product comprising at least one recordable medium storing computer program instructions that, when executed, perform acts of:
creating by a multimodal application a context, the context comprising words taken from at least one second web page different from the first web page, and/or taken from at least one grammar for the at least one second web page, wherein creating the context comprises maintaining a history of at least some words from previously visited web pages, generating occurrence counts for words in the history, and selecting words for the context based at least in part on the occurrence counts; and
supplementing by the multimodal application a grammar and/or lexicon for automatic speech recognition at the first web page in dependence upon the context.

24. The computer program product of claim 23, wherein creating the context further comprises inserting in the context one or more words from a grammar from a previously visited multimodal web page.

25. The computer program product of claim 23, wherein creating the context further comprises selecting words for the context from the history.

26. The computer program product of claim 23, wherein creating the context further comprises generating a frequent values list for words in the history, and selecting words for the context from the history in dependence upon the frequent values list.

27. The computer program product of claim 23, wherein creating the context further comprises generating a list of most recently used words in the history, and selecting words for the context from the history in dependence upon the list of most recently used words.

28. The computer program product of claim 23, wherein creating the context further comprises generating a list of words from the history used during a predetermined period of time, and selecting words for the context from the history in dependence upon the list of words from the history used during a predetermined period of time.

29. The computer program product of claim 23, wherein the grammar is a VoiceXML grammar.

30. The computer program product of claim 23, wherein the multimodal application runs on a voice server.

31. The computer program product of claim 23, wherein the computer program instructions, when executed, further perform acts of:
inferring at least one phoneme for at least one word in the grammar using text to speech conversion; and
adding the at least one phoneme for the at least one word to the lexicon.

32. The computer program product of claim 23, wherein the context comprises words taken from the at least one second web page.

33. The computer program product of claim 23, wherein the context comprises words taken from at least one grammar for the at least one second web page.

* * * * *